United States Patent
Walters, Jr.

(10) Patent No.: US 12,507,688 B1
(45) Date of Patent: Dec. 30, 2025

(54) MOBILE HEATING APPARATUS AND METHOD

(71) Applicant: Thermal Flow Technologies, LLC, Moscow Mills, MO (US)

(72) Inventor: David Charles Walters, Jr., Troy, MO (US)

(73) Assignee: Thermal Flow Technologies, LLC, Moscow Mills, MO (US)

( * ) Notice: Subject to any disclaimer, the term of this patent is extended or adjusted under 35 U.S.C. 154(b) by 0 days.

(21) Appl. No.: 18/947,537

(22) Filed: Nov. 14, 2024

(51) Int. Cl.
*A01M 1/20* (2006.01)
*F23N 5/00* (2006.01)

(52) U.S. Cl.
CPC ............ *A01M 1/2094* (2013.01); *F23N 5/003* (2013.01); *A01M 2200/011* (2013.01)

(58) Field of Classification Search
CPC A01M 1/2094; A01M 2200/011; F23N 5/003
See application file for complete search history.

(56) References Cited

U.S. PATENT DOCUMENTS

| | | | | |
|---|---|---|---|---|
| 4,817,329 A * | 4/1989 | Forbes | ....................... | E04B 1/72 43/132.1 |
| 4,961,283 A * | 10/1990 | Forbes | ................. | A01M 1/2094 43/132.1 |
| 8,479,440 B2 * | 7/2013 | DeMonte | .............. | F24H 3/0488 43/132.1 |
| 2008/0014111 A1 * | 1/2008 | Hedman | .................... | A61L 2/22 422/1 |
| 2011/0064605 A1 * | 3/2011 | Hedman | ................. | A61L 9/015 422/1 |
| 2011/0064607 A1 * | 3/2011 | Hedman | .................... | A61L 2/06 422/1 |
| 2011/0308139 A1 * | 12/2011 | James | .................. | A01M 1/2094 43/132.1 |
| 2012/0204478 A1 * | 8/2012 | Gere | .................... | A01M 1/2094 43/132.1 |
| 2012/0233907 A1 * | 9/2012 | Pattison | .............. | A01M 1/2094 43/124 |
| 2012/0255220 A1 * | 10/2012 | DeMonte | ............ | A01M 1/2094 43/124 |
| 2012/0285944 A1 * | 11/2012 | Bermudez | ............ | A47C 31/007 219/385 |

(Continued)

*Primary Examiner* — Michael H Wang

(57) ABSTRACT

A mobile heating apparatus to heat a space for the treatment of bed bugs within the space includes an air mixing chamber, a fresh air inlet extending from outside the space to the mixing chamber; and a recirculation air inlet extending from inside the space to the mixing chamber. Air from the mixing chamber is passed through a heat exchanger and to an outlet for return to the space. A first CO sensor is associated with the fresh air inlet, and a second CO sensor associated with the recirculation inlet. A control, responsive to the first and second CO sensors, can disable the burner if the first CO sensor detects a CO level in the fresh air in excess of a first predetermined level, and disable the burner if the second CO sensor detects a CO level in excess of a second predetermined level that is higher than the first predetermined level. In some embodiments, blowers are provided to facilitate movement of air in the heater and change the relative proportions of fresh and recirculated air to reduce CO content in the space, or increase the temperature of the space.

24 Claims, 1 Drawing Sheet

(56) References Cited

U.S. PATENT DOCUMENTS

| | | | |
|---|---|---|---|
| 2013/0044997 A1* | 2/2013 | French | A01M 1/226 392/360 |
| 2015/0128483 A1* | 5/2015 | Krupp | F24F 3/14 126/110 A |
| 2015/0181857 A1* | 7/2015 | Mladek | A01M 1/20 43/132.1 |
| 2020/0008416 A1* | 1/2020 | Kieffer | F24H 3/025 |
| 2020/0256559 A1* | 8/2020 | Lucas | F23N 5/006 |

* cited by examiner

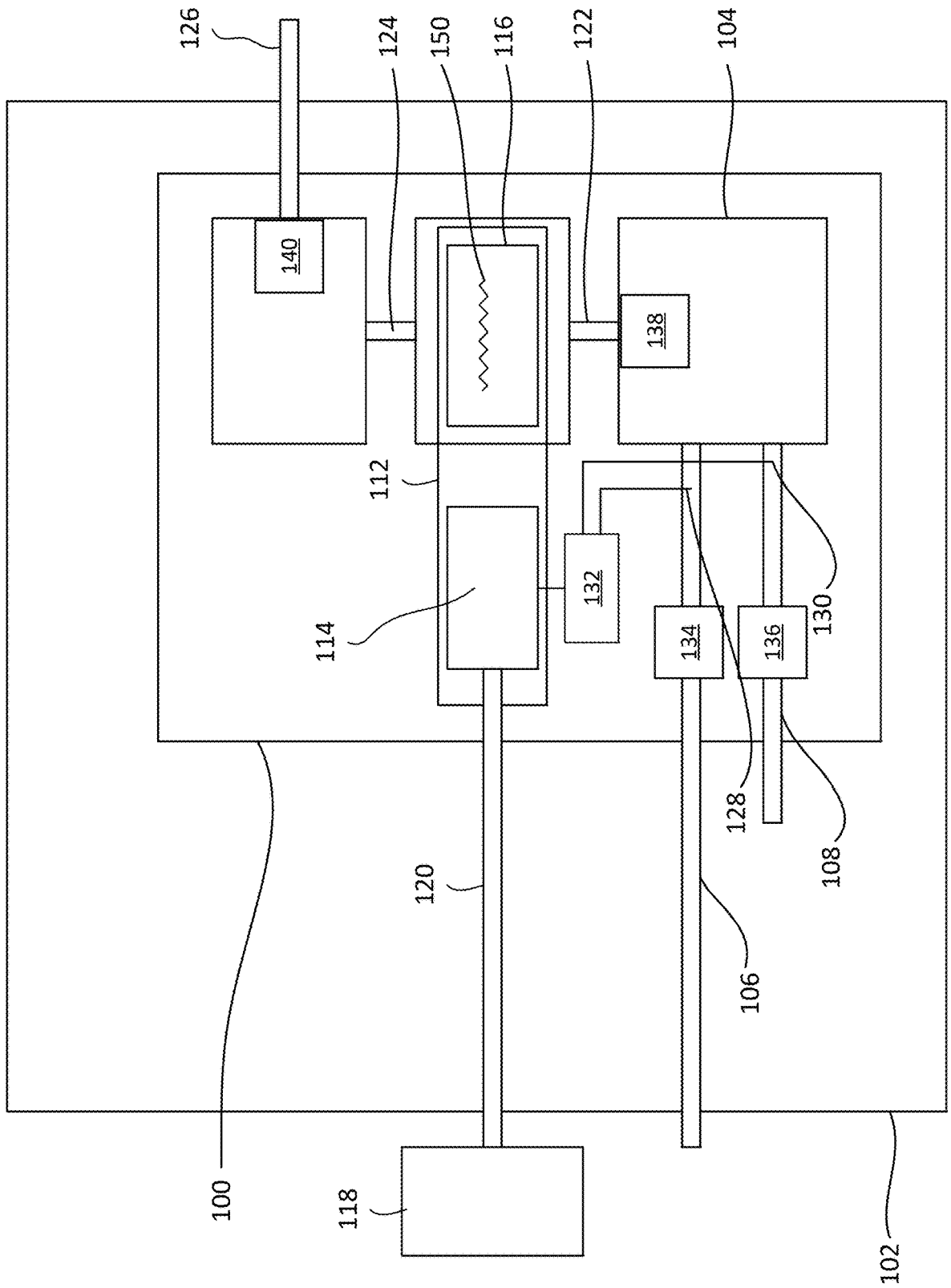

MOBILE HEATING APPARATUS AND METHOD

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure is generally directed toward a mobile heating apparatus and related method of use for eradication of bedbugs.

Bed bugs present a persistent and distressing problem in many households and public spaces worldwide. These tiny, resilient insects infest bedding, furniture, and even walls, feeding on human blood during the night and causing itchy welts and skin irritation. Their elusive nature and ability to hide in cracks and crevices make them challenging to eradicate, often requiring multiple treatments by professional pest control services. Beyond physical discomfort, bed bug infestations can lead to emotional stress, sleep disturbances, and significant financial costs associated with extermination and replacing infested belongings. Additionally, the stigma associated with bed bugs can result in social isolation and psychological distress for affected individuals and families.

Heat is known to be a very effective bed bug killer and it can be to treat infestations. Research has determined the thermal death points for bed bugs and their eggs, as measured by temperature and exposure time to be 118° F. at a constant exposure for at least 90 minutes.

SUMMARY

Embodiments of this disclosure provide a mobile heater and a method of use that can heat a space to a temperature effective to treat bed bugs. According to a preferred embodiment of this disclosure, a mobile heating apparatus to heat a space for the treatment of bed bugs within the space. This mobile heating apparatus can comprise an air mixing chamber, a fresh air inlet extending from outside the space to the mixing chamber, and a recirculation air inlet extending from inside the space to the mixing chamber. The mobile heating apparatus can further comprise a burner and a heat exchanger operatively connected to the burner. A conduit can direct air from the air mixing chamber past the heat exchanger to heat the air, to an outlet provided for directing heated air into the space.

A first CO sensor is associated with the fresh air inlet, and a second CO sensor is associated with the recirculation inlet. A control, responsive to the first and second CO sensors for disabling the burner if the first CO sensor detects a CO level in the fresh air in excess of a first predetermined level, and disabling the burner if the second CO sensor detects a CO level in the recirculated air in excess of a second predetermined level that is higher than the first predetermined level. The predetermined level of the first CO sensor can be, for example, less than or equal to 5 ppm, and the predetermined level of the second CO sensor can be, for example, greater than or equal to 100 ppm.

The mobile heating apparatus can comprise a blower (which can be variable speed) in the fresh air inlet for conveying air from outside the space to the air mixing chamber, a blower (which can be variable speed) in the recirculation air inlet for conveying air from inside the space to the air mixing chamber, and a blower in the outlet for directing heated air into the space. The control can selectively operate the blowers in the fresh air inlet and in the recirculation inlet based upon the CO content of air in the recirculation inlet (as determined by the second CO sensor) to increase the amount of fresh air introduced into the heater through the fresh air inlet. This can be accomplished by turning the blowers off and on, and/or increasing and decreasing the operation of the blowers.

According to a second preferred embodiment of this disclosure, a method of heating a room includes operating a heater having a fresh air inlet, and a recirculation air inlet, mixing and heating the air with a burner, dispending the heated in the air in the room. The method further comprises measuring the CO content of air in the fresh air inlet and in the recirculation inlet and turning off the burner if the CO content in the fresh air inlet exceeds a first predetermined level and/or if the CO content in the recirculated air inlet exceeds a second predetermined level. Alternatively, or in addition, blowers can be provided in the fresh air inlet and in the recirculated air inlet and these blowers can be selectively operated (turn on and turned off, or for variable blowers increased or decreased) based upon the measured CO content of the air in the fresh air inlet and in the recirculated air inlet.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWING

The present disclosure will become more fully understood from the detailed description and the accompanying drawings, wherein:

FIG. 1 is a schematic diagram of a preferred embodiment of a portable heater according to the principles of this disclosure;

In the drawings, reference numbers may be reused to identify similar and/or identical elements.

DETAILED DESCRIPTION

Embodiments of this disclosure provide a mobile heater and a method of use that can heat a space, for example, to a temperature effective to treat bed bugs. According to a preferred embodiment, a mobile heating apparatus 100 is provided to heat a space 102 for the treatment of bed bugs within the space. This mobile heating apparatus 100 can comprise an air mixing chamber 104, a fresh air inlet 106 extending from outside the space to the mixing chamber, and a recirculation air inlet 108 extending from inside the space to the mixing chamber 104. The fresh air inlet 106 provides fresh air from outside the space 100 to the mixing chamber 104. The recirculation air inlet 108 provides air from space 102 to the mixing chamber 104.

The mobile heating apparatus 100 can further comprise a heater 112, which can comprise a burner 114 and a heat exchanger 116 operatively connected to the burner. The burner 114 is preferably supplied with fuel from a tank 118, disposed outside of space 102, connected to the burner 114 by fuel line 120. While positioning the tank 118 outside the space is preferred, the tank can be located in the space.

A duct 122 can direct air from the air mixing chamber 104 past the heat exchanger 116 to cause the air to be heated, and a duct 124 can direct the heated air from the heat exchanger to outlet 126, for delivery to the space 102.

A first CO sensor 128 is associated with the fresh air inlet 106, and a second CO sensor 130 is associated with the recirculation inlet 108. A control 132, responsive to the first and second CO sensors 128, 130 can be programmed to disable the burner 114 (for example by operating a valve to cut off the supply of fuel from tank 118) if the first CO sensor 128 detects a CO level in the fresh air in excess of a first predetermined level (e.g., 5 ppm or less), and/or disabling the burner if the second CO sensor 130 detects a CO level in the recirculated air excess of a second predetermined level that is higher than the first predetermined level (e.g., 100 ppm or less). The first predetermined level is preferably selected to ensure that the fresh air inlet is in fact connected to a source of fresh air and not recirculating air which could result in an undesirable accumulation of CO in the space. Similarly, the second predetermined level is selected to detect and stop the operation of the heater when the level of CO in the space, as reflected by the recirculated air, reaches an undesirable level. The predetermined level of the first CO sensor can be less than or equal to 5 ppm, and the predetermined level of the second CO is greater than or equal to 100 ppm.

In some embodiments fans or blowers can be provided in the fresh air inlet and in the recirculation air inlet to facilitate operation of the portable heater. For example, a blower 134 can be provided for the fresh air inlet line 106, a blower 136 can be provided for the recirculation air inlet 108. Further, a blower 138 can be provided to move air from the air mixer 104, and a blower 140 can be provided to circulate heated air in the space 102.

In some embodiments some or all of the blowers can be controlled by a controller, such as controller 132. The controller 132 can operate the blowers 134 and 136 to control the relative proportions of fresh air that are provided to the mixing chamber 104. For example, if sensor 130 indicates that CO is building up in space 102, the controller 132 can increase the speed of blower 134 and decrease the speed of blower 136 to introduce more fresh air (with lower CO content than the air in the space) to reduce the CO content in the space 102. Similarly, when the sensor 130 indicates that the CO content in the space is at or below an acceptable level, the controller 132 can decrease the speed of blower 134 and increase the speed of blower 136 so that relatively more of the already heated, recirculated air is delivered to air mixing chamber 104. Alternatively, if there is no blower 136, the blower 138 can be sped up to draw more ambient air from space 102 into inlet 108.

In some embodiments it is possible to also include an electric heating element 150, which can heat air so that when the burner 114 is off or operating at a low level, air can still be heated without further increasing the CO content of the ambient air in space 102. The auxiliary electric heater could also operate as a supplement to the burner 114, even when the burner is operating normally.

In a first implementation, the electric heating element 150 and the gas burner 114 are controlled so that the electric heating element is always active, and the gas burner 114 is only activated to assist in reaching or maintaining the set point temperature in the room. For example, the gas burner could be operated at start up to speed up reaching the set temperature, and/or it could be operated to provide supplemental heat when the length of time that the sensed temperature in the is below the set point exceeds a predetermined threshold. When the CO sensor 130 detects a level of CO in excess of a predetermined threshold, the controller 132 can turn the burner 114 down or turn the burner off to slow the creation of CO and/or the controller 132 can operate the blowers as described above to draw in fresh air from outside the space. This fresh air can mix with the recycled air passing over the heat exchange 116 reducing the CO level in the space 102 and/or provided directly to the burner 114, reducing the rate of increase of the CO level in the space.

In a second implementation, the electric heating element 150 and the gas burner 114 are controlled so that the gas burner is the primary heat source, and the electric heating element is only operated when the CO content in the space 102 as determined by the CO sensors exceeds a predetermined threshold. When the CO sensor 130 detects a level of CO in excess of a predetermined threshold, the burner 114 can be turned down or turned off and the electric heating element 150 can be operated to continue to heat the space, in addition blowers can be operated as described above to increase the portion of fresh air can be drawn in from the outside. This fresh air can mix with the room air passing over the heat exchanger reducing the CO level in the room and/or provided directly to the burner, reducing the rate of increase of the CO level in the room. In this latter case, the electric heating element can be operated to provide additional heat, particularly if the temperature of the fresh air is significantly lower than the set point temperature.

In a third control implementation, the electric heating element 150 and the gas burner 114 are controlled so that both the electric heating element and the gas burner are operated simultaneously, and the operation of the burner is decreased and the operation of the electric heating element is increased as the CO content is increasing while above a predetermined threshold and the operation of the heating element is decreased and the operation of the gas burner increased when the CO content is decreasing while below a second predetermined threshold. In addition, fresh air can be drawn in from the outside. This fresh air can mix with the recirculated passing over the heat exchanger reducing the CO level in the room and/or provided directly to the burner, reducing the rate of increase of the CO level in the room. In this latter case, the electric heating element 150 can be operated to provide additional heat, particularly if the temperature of the fresh air is significantly lower than the set point temperature.

In a fourth implementation the gas burner 114 is the primary heat source for the room, and the electric heating element 150 is only operated when the fresh air is being provided from outside the room. The electric heater can be operated to provide additional heat, particularly if the temperature of the fresh air is significantly lower than the set point temperature.

Possible control parameters for the heater are shown in Tables 1-3:

TABLE 1

GAS BURNER ONLY

| Recirculation Sensor | Fresh Air Sensor | Control Action |
|---|---|---|
|  | Exceeds predetermined threshhold | Shut down burner because fresh air inlet is not drawing in fresh air |
| Exceeds predetermined threshhold |  | Shut down burner to stop further generation of CO |
| Exceeds |  | Operate valve/damper in recirculation |

TABLE 1-continued

GAS BURNER ONLY

| Recirculation Sensor | Fresh Air Sensor | Control Action |
|---|---|---|
| predetermined threshhold | | inlet and/or operate valve/damper in fresh air inlet, to increase proportion of air supplied through fresh air inlet, |
| Exceeds predetermined threshhold | | Operate blower in recirculation inlet and/or operate blower in fresh air inlet, to increase proportion of air supplied through fresh air inlet. |

TABLE 2

ELECTRIC HEATER WITH GAS BURNER SUPPLEMENT

| Recirculation CO Sensor | Fresh Air Sensor | Control Action |
|---|---|---|
| | | Initiate gas burner at start up and/or when time to reach set temperature exceeds a predetermined threshold, or set temperature cannot be maintained. |
| | Exceeds predetermined threshold | If burner is operating, shut down burner because fresh air inlet is not drawing in fresh air |
| Exceeds predetermined threshold | | If burner is operating, shut down burner to stop further generation of CO |
| Exceeds predetermined threshold | | If burner is operating, operate valve/damper in recirculation inlet and/or operate valve/damper in fresh air inlet, to increase proportion of air supplied through fresh air inlet, |
| Exceeds predetermined threshold | | If burner is operating, operate blower in recirculation inlet and/or operate blower in fresh air inlet, to increase proportion of air supplied through fresh air inlet. |

TABLE 3

GAS BURNER WITH ELECTRIC HEATER

| Recirculation CO Sensor | Fresh Air Sensor | Control Action |
|---|---|---|
| | | Initiate electric heather at start up and/or when time to reach set temperature exceeds a predetermined threshold, or set temperature cannot be maintained. |
| | Exceeds predetermined threshold | Shut down burner because fresh air inlet is not drawing in fresh air; initiate electric heater to maintain set temperature. |
| Exceeds predetermined threshold | | Shut down burner or reduce burner to stop further generation of CO; initiate electric heater to maintain temperature. |
| Exceeds predetermined threshold | | Operate valve/damper in recirculation inlet and/or operate valve/damper in fresh air inlet, to increase proportion of air supplied through fresh air inlet, and/or initiate electric heater to maintain temperature. If issue persists, shut down burner to stop further generation of CO. |
| Exceeds predetermined threshold | | Operate blower in recirculation inlet and/or operate blower in fresh air inlet, to increase proportion of air supplied through fresh air inlet. If issue persists, shut down burner or reduce burner to stop further generation of CO. |

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

OPERATION

In operation one or more portable heating units are installed in a space 100. The entrance of the fresh air inlet 106 is preferably disposed outside of the space 100. The burner is initiated and air from the air mixing chamber 104 is delivered across the heat exchanger 116 and this heated air is distributed into the space via outlet 126.

Various blowers 134, 126, 138, and 140 can be provided to move air into and through the system, either manually controlled, or automatically controlled, for example with controller 132. For example, when the sensor 130 detects the CO content of the ambient air is getting high, the controller can operate blower 134, or blowers 134 and 136, or blowers 134 and 138 to control the relative proportions of fresh air and recirculated air provided to the mixing chamber, increasing the relative amount of fresh air when the The mobile heating apparatus can comprise a blower in the fresh air inlet for conveying air form outside the space to the air mixing chamber, a blower for in the recirculation air inlet for conveying air from inside the space to the air mixing chamber, and a blower in the outlet for directing heated air into the space. The control can selectively operate the blower in the fresh air inlet and the recirculation inlet based upon the CO content of air in the recirculation inlet to increase the amount of fresh air relative to the recirculated air to reduce the CO content of the air in the space 102. Alternatively when the CO content is within acceptable bounds, the blowers can be operated to change the relative proportion of fresh air to heated, recirculated air to increase or maintain the temperature in the space 102.

What is claimed is:

1. A mobile heating apparatus to heat a space for the treatment of bed bugs within the space, the mobile heating apparatus comprising:
   an air mixing chamber;
   a fresh air inlet extending from outside the space to the mixing chamber;
   a recirculation air inlet extending from inside the space to the mixing chamber;
   a burner;
   a heat exchanger operatively connected to the burner
   a conduit for directing air from the air mixing chamber past the heat exchanger to heat it; an outlet, for directing heated air into the space;

a first carbon dioxide (CO) sensor associated with the fresh air inlet;
a second CO senor associated with the recirculation inlet; and
a control, responsive to the first and second CO sensors for disabling the burner if the first CO sensor detects a CO level in the fresh air in excess of a first predetermined level, and disabling the burner if the second CO sensor detects a CO level in excess of a second predetermined level that is higher than the first predetermined level.

2. The mobile heating apparatus of claim 1, wherein the predetermined level of the first CO sensor is less than or equal to 5 ppm.

3. The mobile heating apparatus of claim 2, wherein the predetermined level of the second CO is greater than or equal to 100 ppm.

4. The mobile heating apparatus of claim 1, wherein the predetermined level of the second CO is greater than or equal to 100 ppm.

5. The mobile heating apparatus of claim 1, further comprising a blower in the fresh air inlet for conveying fresh air from outside the space to the air mixing chamber.

6. The mobile heating apparatus of claim 1, further comprising a blower in the recirculation air inlet for conveying air from inside the space to the air mixing chamber.

7. The mobile heating apparatus of claim 1, further comprising a blower in the outlet for directing heated air into the space.

8. A mobile heating apparatus to heat a space for the treatment of bed bugs within the space, the mobile heating apparatus comprising:
an air mixing chamber;
a fresh air inlet, including a blower, extending from outside the space to the mixing chamber;
a recirculation air inlet extending from inside the space to the mixing chamber;
a heating chamber;
a burner;
a fuel source outside the space connected to the burner;
a heat exchanger operatively connected to the burner, disposed in the heating chamber
a conduit for directing air from the air mixing chamber past the heat exchanger to heat it; an outlet, including a blower, for directing heated air into the space;
a first carbon dioxide (CO) sensor associated with the fresh air inlet;
a second CO senor associated with the recirculation inlet; and
a control, responsive to the first and second CO sensors for disabling the burner if the first CO sensor detects a CO level in the fresh air in excess of a first predetermined level, and disabling the burner if the second CO sensor detects a CO level in excess of a second predetermined level that is higher than the first predetermined level.

9. The mobile heating apparatus of claim 8, wherein the predetermined level of the first CO sensor is less than or equal to 5 ppm.

10. The mobile heating apparatus of claim 9, wherein the predetermined level of the second CO is greater than or equal to 100 ppm.

11. The mobile heating apparatus of claim 8, wherein the predetermined level of the second CO is greater than or equal to 100 ppm.

12. A mobile heating apparatus to heat a space for the treatment of bed bugs within the space, the mobile heating apparatus comprising:
an air mixing chamber;
a fresh air inlet extending from outside the space to the mixing chamber;
a recirculation air inlet extending from inside the space to the mixing chamber;
a burner;
an auxiliary heater;
a heat exchanger operatively connected to the burner
a conduit for directing air from the air mixing chamber past the heat exchanger to heat it;
an outlet, for directing heated air into the space;
a first carbon dioxide (CO) sensor associated with the fresh air inlet;
a second CO senor associated with the recirculation inlet; and
a control, responsive to the first and second CO sensors for disabling the burner if the first CO sensor detects a CO level in the fresh air in excess of a first predetermined level, and disabling the burner if the second CO sensor detects a CO level in excess of a second predetermined level that is higher than the first predetermined level, and operating the auxiliary heater when burner is disabled.

13. The mobile heating apparatus of claim 12, wherein the predetermined level of the first CO sensor is less than or equal to 5 ppm.

14. The mobile heating apparatus of claim 13, wherein the predetermined level of the second CO is greater than or equal to 100 ppm.

15. The mobile heating apparatus of claim 12, wherein the predetermined level of the second CO is greater than or equal to 100 ppm.

16. The mobile heating apparatus of claim 12, further comprising a blower in the fresh air inlet for conveying fresh air from outside the space to the air mixing chamber.

17. The mobile heating apparatus of claim 12, further comprising a blower in the recirculation air inlet for conveying air from inside the space to the air mixing chamber.

18. The mobile heating apparatus of claim 12, further comprising a blower in the outlet for directing heated air into the space.

19. The mobile heater apparatus of claim 12 wherein the auxiliary heater comprises an electric heating element.

20. A mobile heating apparatus to heat a space for the treatment of bed bugs within the space, the mobile heating apparatus comprising:
an air mixing chamber;
a fresh air inlet, including a blower, extending from outside the space to the mixing chamber;
a recirculation air inlet extending from inside the space to the mixing chamber;
a heating chamber;
a burner;
a fuel source outside the space connected to the burner;
an auxiliary heating unit;
a heat exchanger operatively connected to the burner, disposed in the heating chamber
a conduit for directing air from the air mixing chamber past the heat exchanger to heat it;
an outlet, including a blower, for directing heated air into the space;
a first carbon dioxide (CO) sensor associated with the fresh air inlet;

a second CO senor associated with the recirculation inlet; and a control, responsive to the first and second CO sensors for disabling the burner if the first CO sensor detects a CO level in the fresh air in excess of a first predetermined level, and disabling the burner if the second CO sensor detects a CO level in excess of a second predetermined level that is higher than the first predetermined level, and operating the auxiliary heater when the burner is disabled.

21. The mobile heating apparatus of claim 20, wherein the predetermined level of the first CO sensor is less than or equal to 5 ppm.

22. The mobile heating apparatus of claim 21, wherein the predetermined level of the second CO is greater than or equal to 100 ppm.

23. The mobile heating apparatus of claim 20, wherein the predetermined level of the second CO is greater than or equal to 100 ppm.

24. The mobile heater apparatus of claim 20 wherein the auxiliary heater comprises an electric heating element.

* * * * *